United States Patent

Rinderer

[11] Patent Number: 5,720,567
[45] Date of Patent: *Feb. 24, 1998

[54] CABLE TRAY SYSTEM

[75] Inventor: Eric R. Rinderer, Highland, Ill.

[73] Assignee: Sigma-Aldrich Company, St. Louis, Mich.

[*] Notice: The term of this patent shall not extend beyond the expiration date of Pat. No. 5,628,580.

[21] Appl. No.: 726,901

[22] Filed: Oct. 7, 1996

Related U.S. Application Data

[63] Continuation of Ser. No. 425,187, Apr. 19, 1995, Pat. No. 5,628,580.

[51] Int. Cl.⁶ .................................................. F16B 7/00
[52] U.S. Cl. .......................... 403/314; 403/314; 403/22; 403/292; 403/300
[58] Field of Search ......................... 403/292, 294, 403/296–297, 300–301, 305, 311–312, 314, 337–339, 382–383, 205, 403, 187, 192, 363, 407.1, 408.1, 286–287, 21–22, 7–8; 248/58, 49; 52/726.1; 256/68

[56] References Cited

U.S. PATENT DOCUMENTS

| | | |
|---|---|---|
| 1,051,427 | 1/1913 | McCluskey . |
| 1,788,096 | 1/1931 | Friedemann ............. 403/292 |
| 2,588,901 | 3/1952 | Weikart ................... 255/69 |
| 2,645,509 | 7/1953 | Valenta .................. 403/297 |
| 3,104,757 | 9/1963 | Dougherty et al. ...... 198/213 |
| 3,972,638 | 8/1976 | Vivoli .................... 403/174 |
| 3,977,800 | 8/1976 | Cassel .................... 403/172 |
| 4,630,550 | 12/1986 | Weitzman .............. 108/155 |
| 4,691,818 | 9/1987 | Weber ................... 197/666 |
| 4,780,018 | 10/1988 | Godden ................. 403/173 |
| 4,903,354 | 2/1990 | Yeh ....................... 5/53 |
| 4,923,176 | 5/1990 | Heinz .................... 256/65 |
| 4,934,858 | 6/1990 | Beaulieu ................ 403/174 |
| 4,957,449 | 9/1990 | Hataqishi ............... 439/364 |
| 4,988,230 | 1/1991 | Banthia et al. ......... 403/170 |
| 5,078,534 | 1/1992 | White .................... 403/292 |
| 5,127,762 | 7/1992 | Havlovitz ............... 403/298 |
| 5,203,135 | 4/1993 | Bastian .................. 52/726.1 |
| 5,219,449 | 6/1993 | Hoshino ................ 403/297 |

FOREIGN PATENT DOCUMENTS

| | | | |
|---|---|---|---|
| 42117 | 1/1888 | Germany ............... 403/297 |
| 3199703 | 8/1991 | Japan .................... 403/292 |
| 3199704 | 8/1991 | Japan .................... 403/292 |
| 1602223 | 11/1981 | United Kingdom .... 403/292 |

*Primary Examiner*—Harry C. Kim
*Attorney, Agent, or Firm*—Senniger, Powers, Leavitt & Roedel

[57] ABSTRACT

A splice system having two rails to be connected end to end and splice member having a center part and a pair of end parts sized for insertion in open ends of the two rails. The rails to be connected end to end having first and second opposing walls and a hole in the first walls. The end parts of the splice members having threaded openings adapted to register with holes in the rails. The splice member is connected to the rails with bolts, the arrangement being such that, when the bolts are tightened, heads of the bolts outside the rails are drawn toward first walls of respective rails and end parts of the splice member inside the rails are pulled away from second walls of the rails and tight against the first walls of respective rails thereby to splice the rails together.

6 Claims, 2 Drawing Sheets

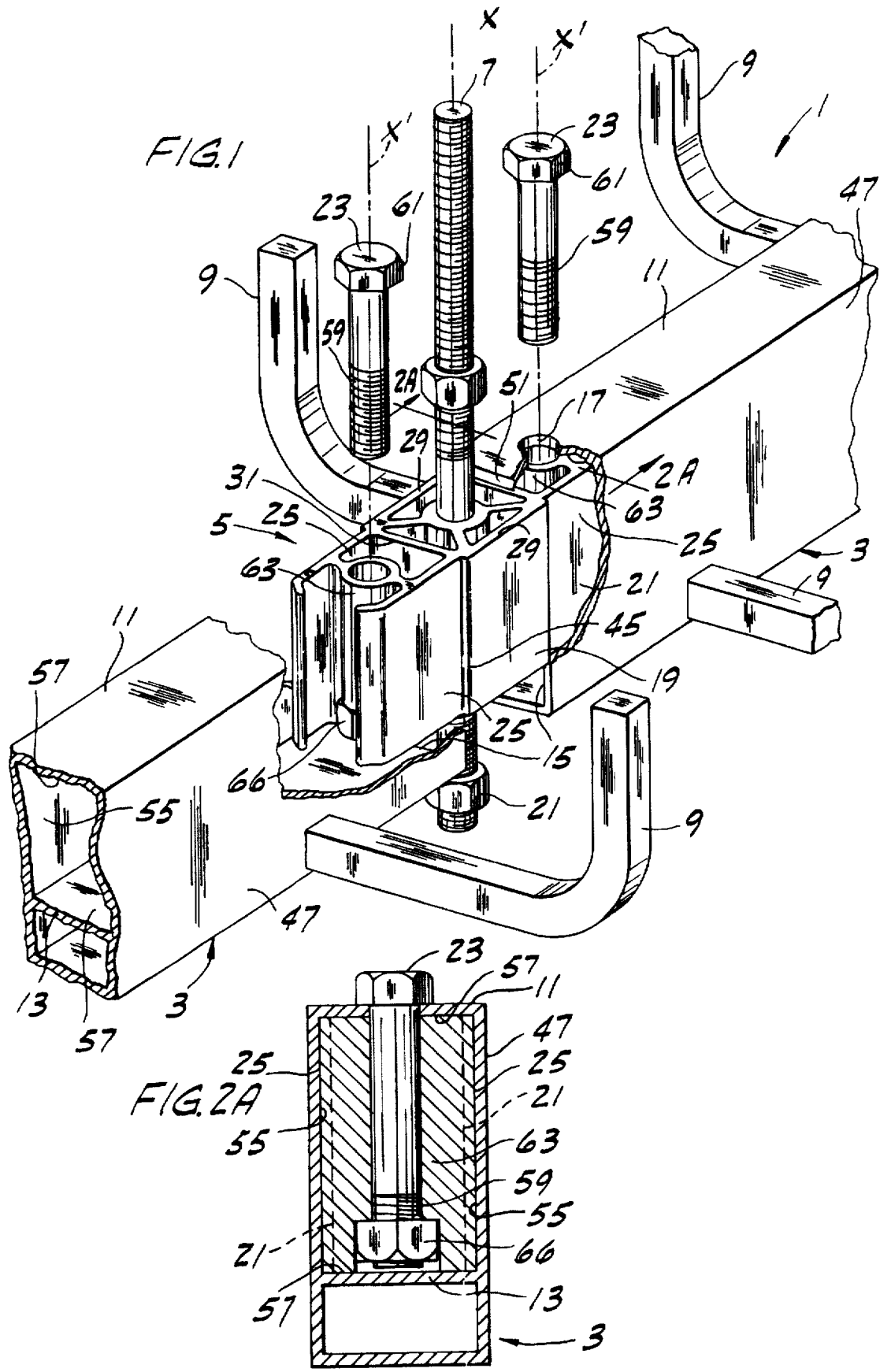

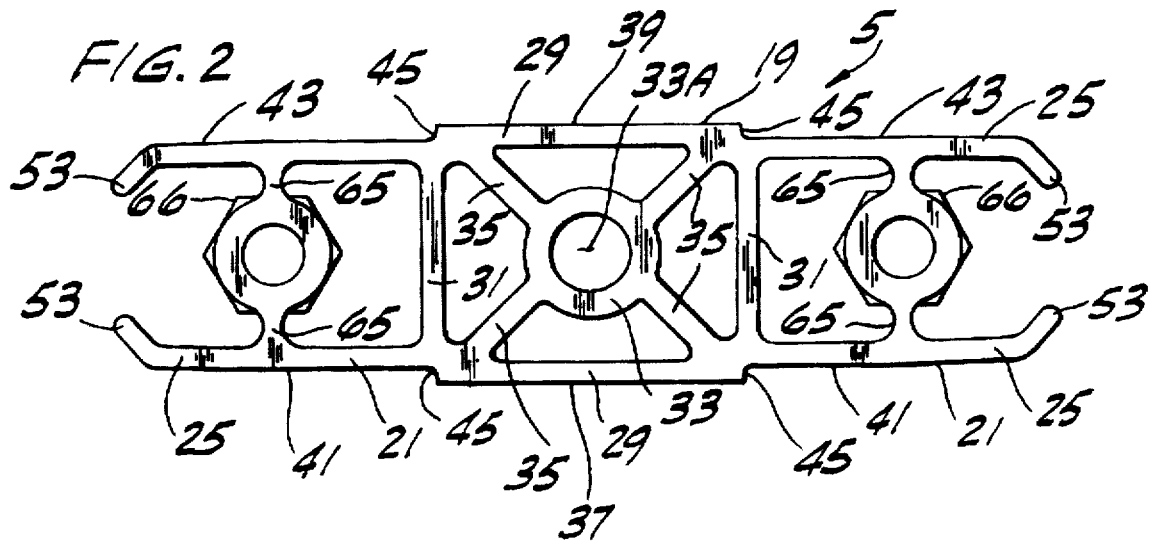
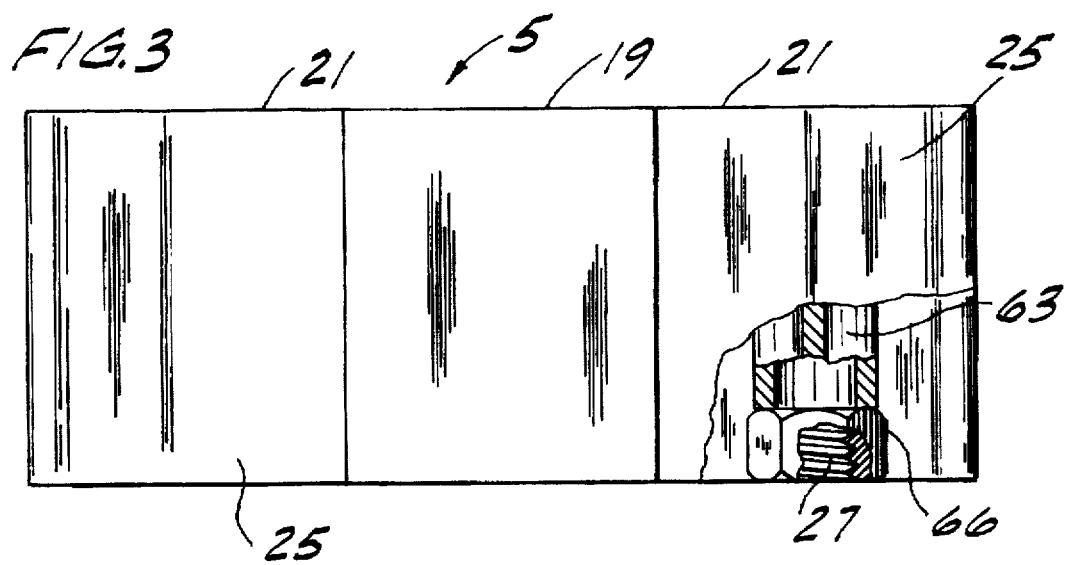
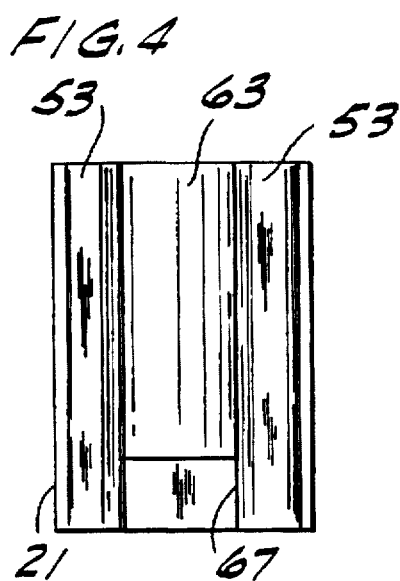
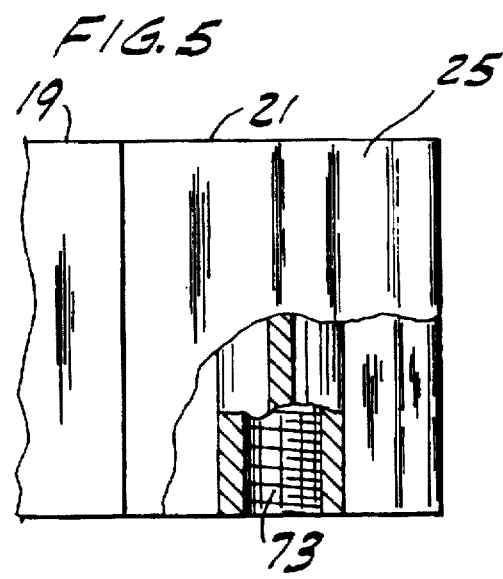

CABLE TRAY SYSTEM

This is a continuation of application Ser. No. 08/425,187, filed Apr. 19, 1995, U.S. Pat. No. 5,628,580.

BACKGROUND OF THE INVENTION

This invention relates generally to what is referred to in the industry as "cable tray" systems used to support electrical wiring, cables and conduit, and more particularly to a splice system for connecting sections of cable tray.

This invention is especially (but not exclusively) directed to cable tray systems of the type described in co-assigned pending U.S. application Ser. No. 08/175,591, filed Dec. 29, 1993, U.S. Pat. No. 5,564,658, which describes a lightweight cable tray system adapted for carrying data transmission lines and the like. The pending application further discloses a splice system for connecting the rails of adjacent cable tray sections. This aforesaid system comprises a splice member having a center part and two end parts receivable in the open ends of two rails to be connected. Spring-loaded detents mounted on the end parts of the splice member snap through holes in the rails to secure the splice member in place and thus connect the rails. While this design is satisfactory in most respects, additional steps must be taken to meet Section 318-7 (b)(4) of the National Electric Code relating to the electrical grounding of metal cable tray systems.

There is a need, therefore, for a splice system that is lightweight and easy to install and meets the electrical grounding requirements of the National Electric Code.

SUMMARY OF THE INVENTION

Among the several objects of this invention may be noted the provision of a splice system which is especially suited for connecting rails in a way which satisfies existing electrical codes and standards (e.g., grounding requirements of the National Electrical Code for metal cable tray systems); the provision of a splice system which has a minimum number of loose parts; the provision of a splice system which maintains all projecting fasteners away from the sides of rails to avoid contact with the lines being carried by the system; and the provision of which is economical to manufacture and easy to install.

In general, the splice system of this invention comprises two tubular rails to be connected end to end, each rail having first and second opposing walls, an open end, and a hole in the first wall of the rail generally adjacent its open end. The system also includes a splice member having a center part and a pair of end parts sized for insertion in respective open ends of the two rails to be connected. The end parts of the splice member have threaded openings adapted to register with the holes in the rails when the end parts are inserted in the rails. The system further comprises a pair of bolts having heads larger than the holes in the rails and threaded shanks sized for passage through the holes into threaded engagement with the threaded openings in respective end parts of the splice member. The arrangement is such that, when the bolts are tightened, the heads of the bolts outside the rails are drawn toward the first walls of respective rails and the end parts of the splice member inside the rails are pulled away from the second walls of the rails and tight against the first walls of respective rails thereby to splice the rails together.

In another aspect of this invention, the center part of the splice member has an opening for receiving a support rod along an axis generally parallel to the axes of the threaded openings in the end parts of the splice member. The center part of the splice member is sized for abutting against the ends of the rail when the end parts are inserted in the rails so that the ends of the rails are held spaced apart and the opening in the center part is exposed for receiving a support rod.

Other objects and features will be in part apparent and in part pointed out hereinafter.

BRIEF DESCRIPTION OF THE DRAWINGS

FIG. 1 is a perspective view of a splice member of the present invention interconnecting two rails, parts of the rails being broken away to show the splice member in more detail;

FIG. 2 is a top plan view of the splice member of FIG. 1;

FIG. 2A is a cross section taken along line 2—2 of FIG. 1 showing the splice connected to a rail;

FIG. 3 is a side view of the splice member of FIG. 2 with a portion removed to reveal a tubular formation and nut of the splice member;

FIG. 4 is an end view of the splice member shown in FIG. 3; and

FIG. 5 is a partial side view of a splice member of another embodiment, part of the splice member being broken away to show a threaded opening.

Corresponding parts are designated by corresponding reference numerals in the several views of the drawings.

DETAILED DESCRIPTION OF THE PREFERRED EMBODIMENT

Referring now to the drawings, and first to FIG. 1, there is generally indicated at 1 a splice system of this invention. The system 1 is shown as comprising two tubular rails, each generally designated 3, and a splice member, generally indicated at 5, for connecting the two rails end to end. The splice system 1 is typically supported in a horizontal position by a vertical rod 7, but it will be understood that the rails 3 can be supported in other orientations (e.g., vertical or at an angle) without departing from the scope of this invention. The rails 3 are generally rectangular in transverse cross section. Each rail 3 has first and second opposing walls 11, 13, an open end 15, and a hole 17 in the first wall 11 of the rail generally adjacent its open end. A plurality of supports 9 extend laterally outward from the rails at spaced intervals for supporting a series of runs of electrical cable, data transmission lines and the like.

As shown in FIGS. 1 and 2, the splice member 5 comprises a center part 19 and a pair of end parts, each designated 21, the end parts being receivable in the open ends 15 of the rails 3 to be connected by the splice. Bolts 23 are provided for securing the end parts 21 of the splice 5 in respective ends 15 of the two rails 3. Each end part 21 of the splice member 5 includes a pair of opposing generally parallel side walls 25 and a threaded opening 27. The threaded openings 27 in the two end parts 21 are adapted to register (align) with the holes 17 in the rails 3 when the end parts are inserted in the rails.

The center part 19 of the splice 5 is generally rectangular in shape, having two opposing generally parallel side walls 29, a pair of opposing generally parallel end walls 31, and a central sleeve 33 defining a vertical bore 33A extending the full height of the splice member. The sleeve 33 is connected to the side and end walls 29, 31 by vertical webs 35 extending diagonally with respect to the center part 19 of the splice 5. The sleeve 33 is designed to receive a support rod 7 along an axis X generally parallel to the axes X"of the threaded openings 27 in the end parts 21 of the splice member 5. The support rod 7 is used to suspend the splice 5 and the two rails 3 connected by the splice from a suitable support structure, such as an overhead beam.

The center part 19 of the splice member 5 is sized for abutting against the open ends of the rails 3 when the end parts 21 of the splice member are inserted in the rails so that the ends of the rails are held spaced apart by the center part and the bore 33A in the center part is exposed for receiving the support rod 7. The overall width of the center part 19 as measured from the outside face 37 of one side wall 29 to the outside face 39 of the opposite side wall 29 is greater than the overall width of each end part 21 as measured from the outside face 41 of one side wall 25 to the outside face 43 of the other side wall 25, four exterior shoulders 45 thus being formed at the corners of the center part 19. The spacing between the outer faces 37, 39 of the side walls of the center part 19 of the splice corresponds to the spacing between the outer faces 47 of the side walls of the rails 3 to be connected by the splice member 5 so that when the end parts 21 of the splice are received in the rails, the outer faces of the side walls of the center part of the splice are essentially coplanar (flush) with the outer faces of the side walls of the rails, and the end edges 51 of the rails abut the shoulders 45 at the corners of the center part of the splice. This design forms a flush, gapless interconnection between the splice 5 and the rails 3 and avoids exposing sharp and/or protruding edges to lines carried by the support system, thereby preventing snagging and/or possible damage to the lines.

As noted previously, each end part 21 of the splice has a pair of opposing generally parallel side walls 25 extending endwise from a respective end wall 31 of the center part 19. The end edges 53 of the side walls 25 of the splice are tapered to facilitate insertion of the end parts of the splice into the respective rails 3. The fit of the end parts 21 inside the rails is preferably a close fit to provide the stabilization necessary for a good connection. The distance between the outer faces 41, 43 of the side walls of the end parts 21 is only slightly less than the distance between the inside faces 55 of the side walls of the rails 3, and the overall height of the end parts is only slightly less than the distance between the inside surfaces 57 of walls 11 and 13 of the rails.

The center part 19 and end parts 21 of the splice are preferably integrally formed as a one-piece extrusion from the same material used to form the rails 3. To form a splice 5, a continuous extrusion having a cross sectional shape corresponding to that of the splice is cut to a length corresponding to the height of the splice.

In order to connect the splice member 5 to the rails 3, the end parts 21 of the splice member 5 are inserted into the open ends 15 of the rails until the threaded openings 27 of the end parts 21 are vertically aligned with the openings 17 in the walls 11 of the rails. Bolts 23 are then inserted through the vertically aligned holes 17 in the rails 3 and threaded openings 27 in the end parts 21. The bolts 23 have threaded shanks 59 sized for passage through the holes 17 into threaded engagement with the threaded openings 27 in the end parts 21 of the splice member 5, and heads 61 larger than the holes in the first walls 11 of the rails 3. Upon tightening the bolts 23, the heads 61 of the bolts outside the rail 3 are drawn toward the first walls 11 of the respective rails, and the end parts 21 of the splice member 5 inside the rails are pulled away from the second walls 13 of the rails and tight against the first walls 11 of respective rails thereby to splice the rails together (FIG. 2A). The bolts should be torqued to the extent required to provide for a good electrical connection between the splice 5 and rails 3. This bolted connection or bridge between the splice member 5 and the rails 3 provides a mechanical connection which satisfies the grounding and electrical conductivity requirements of the National Electrical Code for cable tray systems.

In a preferred embodiment, each end part 21 of the splice member 5 includes a tubular formation 63 (e.g., sleeve) in axial alignment with the threaded opening 27. Vertical webs 65 extend between the side walls 25 of the end part 21 to support the tubular formation 63 therebetween. The tubular formation 63 is disposed between the threaded opening 27 and the first wall 11 of the rail 3 when the end part 21 is inserted in the rail so that the tubular formation 63 is positioned to receive a bolt 23 inserted through the hole 17 in the rail.

A shown in FIGS. 1-3, the threaded opening 27 in the end part 21 is provided by a nut 66 received in a cavity 67 formed by removing one end of the tubular formation 63 (its lower end as shown in FIG. 4). The nut 66 is press fit into the cavity 67 so that opposite flats of the nut are disposed snugly between the ribs 65 to hold the nut against rotation. The nut 66 may be bonded to the tubular formation 63 with a suitable glue to securely hold the nut in the cavity 67 prior to installation of the splice members. The nut may be adhesively secured in place by the placement of glue on an upper surface of the nut which is placed in contact with a lower surface of the tubular formation 63. Thus, the nut 66 is secured in place prior to installation of the splice system 1, thus minimizing the number of loose parts necessary to install the system.

In an alternative embodiment, the threaded opening is machined directly into the tubular formation 63 (FIG. 5). The threaded shank 59 of the bolt 23 engages internal threads 73 formed on the inside surface of the tubular formation 63. As illustrated, the threads 73 are at the lower end of the formation 63, but it will be understood that the formation could be threaded anywhere along its length. This design further reduces the number of parts required for the splice system 1. Other variations are also possible.

While the embodiment discussed above is designed to have the ends 15 of the rails 3 abut against the center part 19, the splice member 5 may also be constructed to have the ends of the rails abut directly against one another. In other words, the end parts 21 of the splice member would be connected end to end without an interconnecting center part. The rails 3 and splice member 5 could then be supported by a clevis type hanger (not shown) or any other suitable device.

As shown in the drawings, the splice system 1 is configured so that the axis X" of each bolt 23 is generally at right angles to the first wall 11 of the respective rail. This arrangement is preferable not only for ease of installation but also to keep the heads of the bolts away from the lines carried by the supports 9. However, it is contemplated that the bolts 23 could extend at right angles to walls 47 without departing from the scope of this invention. In the latter instance, the splice member 5 would be rotated 90 degrees from the position shown in FIG. 1, so that the tubular formation 63 and threaded opening 27 are disposed generally horizontally instead of vertically.

It will be observed from the foregoing that the splice system of this invention has numerous advantages. Importantly, the system satisfies the grounding requirements of the National Electrical Code. Also, the minimum number of component parts needed for the splice system provides for economical manufacture and facilitates installation. There is no need to drill a second hole in the second wall of the rail since the bolts only enter the first wall of the rail. Moreover, the location of the nut within the rail eliminates the need for access underneath the rail for tightening the bolt. The illustrated configuration also allows various runs of cable, data transmission lines and the like to be supported without exposure to rough or protruding edges which might snag or damage the lines.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A splice system comprising
    two tubular rails to be connected end to end, each rail being generally rectangular in transverse cross section and having top and bottom opposing walls, opposing side walls, an open end, and a hole in the top wall of the rail generally adjacent its open end, each rail having a width defined by the distance between the opposing side walls,
    a series of rungs extending laterally outwardly from the side walls of the rails a distance greater than the width of the rails to provide a wide supporting surface for supporting cable,
    a splice member having a pair of end parts sized for insertion in respective open ends of the two rails to be connected,
    the end parts of the splice member having threaded openings adapted to register with the holes in the rails when the end parts are inserted in the rails,
    a pair of bolts having heads larger than the holes in the rails and threaded shanks sized for passage through the holes into threaded engagement with the threaded openings in the respective end parts of the splice member, the arrangement being such that, when the bolts are tightened, the heads of the bolts outside the rails are drawn toward said top walls of the respective rails and the end parts of the splice member inside the rails are pulled away from said bottom walls of the rails and tightened against said top walls of the respective rails thereby splicing the rails together, and
    at least one cable supported by the rungs of the connected rails, the rails being adapted to extend generally horizontally to support the cable in a generally horizontal position.

2. A splice system as set forth in claim 1 further comprising a tubular formation in axial alignment with each threaded opening in the end parts of the splice member, said tubular formation being disposed between said threaded opening and said top wall of the rail when the end part is inserted in the rail so that the tubular formation is positioned to receive the bolt which is inserted through the hole in the rail into said threaded opening.

3. A splice system as set forth in claim 2 wherein each end part of the splice member further comprises a nut having said threaded opening therethrough, said nut being held against rotation adjacent one end of said tubular formation.

4. A splice system as set forth in claim 3 wherein said nut is received in a cavity formed in said one end of the tubular formation.

5. A splice system as set forth 4 wherein each end part of the splice member further comprises a pair of spaced apart generally parallel walls extending endwise from a center part of the splice member in planes generally at right angles to said top and bottom walls of a respective rail when the end part of the splice member is inserted in the rail, and means extending between the walls of the splice member supporting said tubular formation therebetween.

6. A splice system as set forth in claim 1 further comprising a center part disposed between the pair of end parts, and wherein the center part of the splice member is sized for abutting against the ends of the rails when the end parts of the splice member are inserted in the rails so that the ends of the rails are held spaced apart by the center part.

* * * * *